United States Patent
Kusano

(10) Patent No.: US 12,147,731 B2
(45) Date of Patent: Nov. 19, 2024

(54) PORTABLE PLAYBACK DEVICE STATE VARIABLE

(71) Applicant: Sonos, Inc., Santa Barbara, CA (US)

(72) Inventor: Mieko Kusano, Santa Barbara, CA (US)

(73) Assignee: Sonos, Inc., Goleta, CA (US)

(*) Notice: Subject to any disclaimer, the term of this patent is extended or adjusted under 35 U.S.C. 154(b) by 0 days.

(21) Appl. No.: 18/503,096

(22) Filed: Nov. 6, 2023

(65) Prior Publication Data

US 2024/0220191 A1     Jul. 4, 2024

Related U.S. Application Data

(63) Continuation of application No. 18/051,383, filed on Oct. 31, 2022, now Pat. No. 11,809,781, which is a
(Continued)

(51) Int. Cl.
*H04N 21/414*     (2011.01)
*G05B 15/02*      (2006.01)
(Continued)

(52) U.S. Cl.
CPC ............. *G06F 3/165* (2013.01); *G05B 15/02* (2013.01); *H04N 21/41407* (2013.01);
(Continued)

(58) Field of Classification Search
CPC .. G06F 3/165; G05B 15/02; H04N 21/41407; H04N 21/43637; H04N 21/44209; H04N 21/44227; H04N 21/8113; H04R 2227/005

See application file for complete search history.

(56) References Cited

U.S. PATENT DOCUMENTS

| 5,440,644 A | 8/1995 | Farinelli et al. |
| 5,761,320 A | 6/1998 | Farinelli et al. |
(Continued)

FOREIGN PATENT DOCUMENTS

| CN | 1882999 A | 12/2006 |
| CN | 101385304 A | 3/2009 |
(Continued)

OTHER PUBLICATIONS

Notice of Allowance mailed on Sep. 21, 2018, issued in connection with U.S. Appl. No. 15/898,386, filed Feb. 16, 2018, 9 pages.
(Continued)

*Primary Examiner* — Sm A Rahman

(57) ABSTRACT

Systems, methods, apparatus, and articles of manufacture to facilitate playback of multimedia content are disclosed. An example apparatus includes a network interface configured to receive audio content over a playback network. A processor comprising instructions which when executed, cause the processor to detect that a portable playback device has joined the playback network. The processor is to update a state variable to indicate that the portable playback device has joined the playback network. The processor is to play audio content received over the playback network based on the state variable. The processor is to detect that the portable playback device is not joined to the playback network. The processor is to, after detecting that the portable playback device is not joined to the playback network, update the state variable to indicate that the portable playback device is not joined to the playback network.

20 Claims, 10 Drawing Sheets

Related U.S. Application Data continuation of application No. 17/562,078, filed on Dec. 27, 2021, now Pat. No. 11,487,500, which is a continuation of application No. 16/658,343, filed on Oct. 21, 2019, now Pat. No. 11,210,053, which is a continuation of application No. 16/142,618, filed on Sep. 26, 2018, now Pat. No. 10,452,346, which is a continuation of application No. 15/898,386, filed on Feb. 16, 2018, now Pat. No. 10,120,643, which is a continuation of application No. 14/977,113, filed on Dec. 21, 2015, now Pat. No. 9,898,244, which is a continuation of application No. 13/534,404, filed on Jun. 27, 2012, now Pat. No. 9,715,365.

(51) Int. Cl.
 *G06F 3/16* (2006.01)
 *H04N 21/4363* (2011.01)
 *H04N 21/442* (2011.01)
 *H04N 21/81* (2011.01)

(52) U.S. Cl.
 CPC . *H04N 21/43637* (2013.01); *H04N 21/44209* (2013.01); *H04N 21/44227* (2013.01); *H04N 21/8113* (2013.01); *H04R 2227/005* (2013.01)

(56) References Cited

U.S. PATENT DOCUMENTS

| | | |
|---|---|---|
| 5,923,902 A | 7/1999 | Inagaki |
| 5,991,812 A | 11/1999 | Srinivasan |
| 6,032,202 A | 2/2000 | Lea et al. |
| 6,128,656 A | 10/2000 | Matchefts et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 6,801,529 B1 | 10/2004 | McGrane et al. |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,508,638 B2 | 3/2009 | Hooper |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,917,082 B2 | 3/2011 | Goldberg et al. |
| 7,949,727 B2 | 5/2011 | Jensen |
| 7,979,516 B2 | 7/2011 | Dacosta |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,160,603 B1 | 4/2012 | Bertz et al. |
| 8,234,395 B2 | 7/2012 | Millington |
| 8,483,853 B1 | 7/2013 | Lambourne |
| 8,484,853 B1 | 7/2013 | Laube |
| 8,538,564 B2 | 9/2013 | Almstrand et al. |
| 8,572,224 B2 | 10/2013 | Hite et al. |
| 8,752,190 B2 | 6/2014 | Kamperman |
| 8,942,252 B2 | 1/2015 | Balassanian et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2002/0178360 A1* | 11/2002 | Wenocur ........... H04L 63/12 713/170 |
| 2003/0157951 A1 | 8/2003 | Hasty, Jr. |
| 2004/0024478 A1 | 2/2004 | Hans et al. |
| 2004/0086120 A1 | 5/2004 | Akins et al. |
| 2005/0165954 A1 | 7/2005 | Burdick et al. |
| 2006/0020784 A1 | 1/2006 | Jonker et al. |
| 2006/0279294 A1 | 12/2006 | Cehelnik |
| 2007/0015537 A1 | 1/2007 | Debiasio et al. |
| 2007/0121981 A1 | 5/2007 | Koh et al. |
| 2007/0142944 A1 | 6/2007 | Goldberg et al. |
| 2007/0156779 A1 | 7/2007 | Ho et al. |
| 2008/0010372 A1* | 1/2008 | Khedouri ......... H04N 21/47202 709/224 |
| 2008/0025535 A1 | 1/2008 | Rajapakse |
| 2008/0189359 A1 | 8/2008 | Sasaki et al. |
| 2009/0116463 A1 | 5/2009 | Hirano et al. |
| 2009/0197524 A1 | 8/2009 | Haff et al. |
| 2009/0315766 A1 | 12/2009 | Khosravy et al. |
| 2010/0031366 A1 | 2/2010 | Knight et al. |
| 2010/0034393 A1 | 2/2010 | Sorek et al. |
| 2010/0121941 A1 | 5/2010 | Harrang et al. |
| 2010/0150123 A1 | 6/2010 | Kim et al. |
| 2010/0246534 A1 | 9/2010 | Vargantwar et al. |
| 2010/0284389 A1 | 11/2010 | Ramsay et al. |
| 2010/0299639 A1 | 11/2010 | Ramsay et al. |
| 2011/0002466 A1 | 1/2011 | Kwak et al. |
| 2011/0116413 A1 | 5/2011 | Arai |
| 2011/0117978 A1 | 5/2011 | Janik et al. |
| 2012/0079271 A1 | 3/2012 | Cordeiro et al. |
| 2012/0099594 A1 | 4/2012 | Lau et al. |
| 2012/0102106 A1 | 4/2012 | Chen |
| 2013/0238992 A1 | 9/2013 | Zhang et al. |

FOREIGN PATENT DOCUMENTS

| | | |
|---|---|---|
| CN | 101617304 A | 12/2009 |
| CN | 101911038 A | 12/2010 |
| CN | 102077191 A | 5/2011 |
| CN | 102456340 A | 5/2012 |
| EP | 1389853 A1 | 2/2004 |
| JP | 2007295084 | 11/2007 |
| JP | 2009147575 | 7/2009 |
| JP | 2012075141 A | 4/2012 |
| KR | 100794622 | 1/2008 |
| KR | 20110037680 | 4/2011 |
| WO | 200153994 | 7/2001 |
| WO | 2003093950 A2 | 11/2003 |

OTHER PUBLICATIONS

Notice of Allowance mailed on Aug. 25, 2017, issued in connection with U.S. Appl. No. 14/976,981, filed Dec. 21, 2015, 12 pages.
Notice of Allowance mailed on May 30, 2017, issued in connection with U.S. Appl. No. 14/976,822, filed Dec. 21, 2015, 13 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Advisory Action mailed on Aug. 4, 2016, issued in connection with U.S. Appl. No. 13/534,404, filed Jun. 27, 2012, 6 pages.
Advisory Action mailed on Feb. 6, 2015, issued in connection with U.S. Appl. No. 13/534,404, filed Jun. 27, 2012, 4 pages.
Anonymous: "Wifi Tether—Tasker Wiki", 2012, XP055340733,

(56) References Cited

OTHER PUBLICATIONS

Retrieved from the Internet: URL: http://tasker.wikidot.com/wifi-tether, 3 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Patent Office, First Office Action and Translation mailed on Dec. 13, 2021, issued in connection with Chinese Application No. 201811586143.X, 9 pages.
Chinese Patent Office, Office Action mailed on Mar. 2, 2017, issued in connection with Chinese Patent Application No. 201380044594.X, 16 pages.
Chinese Patent Office, Second Office Action mailed on Jun. 27, 2018, issued in connection with Chinese Application No. 201380044594.X, 3 pages.
Chinese Patent Office, Second Office Action mailed on Nov. 6, 2017, issued in connection with Chinese Patent Application No. 201380044594.X, 7 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report mailed on Nov. 11, 2019, issued in connection with European Application No. 19196815.5, 6 pages.
European Patent Office, Extended European Search Report mailed on Apr. 26, 2022, issued in connection with European Application No. 21191523.6, 11 pages.
European Patent Office, Office Action mailed on Dec. 13, 2017, issued in connection with European Patent Application No. 13809601.1, 8 pages.
European Patent Office, Office Action mailed on Feb. 13, 2017, issued in connection with European Application No. 13809601.1, 8 pages.
European Patent Office, Summons to Attend Oral Proceedings mailed on Jun. 6, 2018, issued in connection with European Patent Application No. 13809601.1, 11 pages.
European Patent Office, Supplementary European Search Report mailed on Oct. 27, 2015, issued in connection with European Patent Application No. 13809601.1, 8 pages.
European Patent Office, Supplementary European Search Report mailed on Aug. 31, 2016, issued in connection with European Patent Application No. 13809601.1, 8 pages.
Final Office Action mailed on May 16, 2016, issued in connection with U.S. Appl. No. 13/534,404, filed Jun. 27, 2012, 13 pages.
Final Office Action mailed on Nov. 18, 2014, issued in connection with U.S. Appl. No. 13/534,404, filed Jun. 27, 2012, 11 pages.
Final Office Action mailed on Feb. 23, 2017, issued in connection with U.S. Appl. No. 14/976,822, filed Aug. 12, 2016, 11 pages.
Hu et al., "User-provided multimedia content distribution architecture in mobile and ubiquitous communication networks", Journal of Network and Computer Applications, 2011, vol. 34, 121-136.
International Bureau, International Preliminary Report onPatentability, mailed on Jan. 8, 2015, issued in connection with InternationalApplication No. PCT/US2013/047913, filed on Jun. 26, 2013, 7 pages.
International Searching Authority, International Search Report mailed on Oct. 16, 2013, issued in connection with International Application No. PCT/US2013/047913, filed on Jun. 26, 2013, 5 pages.
International Searching Authority, Written Opinion mailed on Oct. 16, 2013, issued in connection with International Application No. PCT/US2013/047913, filed on Jun. 26, 2013, 5 pages.
Japanese Patent Office, Full English Translation of Office Action mailed on Sep. 5, 2017, issued in connection with Japanese Patent Application No. 2016-118151, 2 pages.
Japanese Patent Office, Office Action mailed on Mar. 15, 2016, issued in connection with Japanese Patent Application No. JP2015-520468, 8 pages.
Japanese Patent Office, Office Action mailed on Sep. 5, 2017, issued in connection with JP Application No. 2016-118151, 5 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Jul. 1, 2015, issued in connection with U.S. Appl. No. 13/534,404, filed Jun. 27, 2012, 11 pages.
Non-Final Office Action mailed on May 9, 2014, issued in connection with U.S. Appl. No. 13/534,404, filed Jun. 27, 2012, 12 pages.
Non-Final Office Action mailed on Aug. 12, 2016, issued in connection with U.S. Appl. No. 14/976,822, filed Aug. 12, 2016, 21 pages.
Non-Final Office Action mailed on Jan. 12, 2017, issued in connection with U.S. Appl. No. 13/534,404, filed Jun. 27, 2012, 13 pages.
Non-Final Office Action mailed on Mar. 18, 2021, issued in connection with U.S. Appl. No. 16/658,343, filed Oct. 21, 2019, 9 pages.
Non-Final Office Action mailed on Feb. 24, 2017, issued in connection with U.S. Appl. No. 14/977,113, filed Dec. 21, 2015, 13 pages.
Non-Final Office Action mailed on Feb. 28, 2017, issued in connection with U.S. Appl. No. 14/976,981, filed Dec. 21, 2015, 12 pages.
Non-Final Office Action mailed on May 9, 2018, issued in connection with U.S. Appl. No. 15/898,386, filed Feb. 16, 2018, 14 pages.
Notice of Allowance mailed on Oct. 4, 2017, issued in connection with U.S. Appl. No. 14/977,113, filed Dec. 21, 2015, 7 pages.
Notice of Allowance mailed on May 10, 2017, issued in connection with U.S. Appl. No. 13/534,404, filed Jun. 27, 2012, 8 pages.
Notice of Allowance mailed on Jul. 13, 2022, issued in connection with U.S. Appl. No. 17/562,078, filed Dec. 27, 2021, 9 pages.
Notice of Allowance mailed on Mar. 17, 2023, issued in connection with U.S. Appl. No. 18/051,383, filed Oct. 31, 2022, 8 pages.
Notice of Allowance mailed on Aug. 20, 2019, issued in connection with U.S. Appl. No. 16/142,618, filed Sep. 26, 2018, 8 pages.
Notice of Allowance mailed on Jul. 20, 2023, issued in connection with U.S. Appl. No. 18/051,383, filed Oct. 31, 2022, 8 pages.
Notice of Allowance mailed on Oct. 20, 2021, issued in connection with U.S. Appl. No. 16/658,343, filed Oct. 21, 2019, 14 pages.

* cited by examiner

PORTABLE PLAYBACK DEVICE STATE VARIABLE

CROSS-REFERENCE TO RELATED APPLICATIONS

This disclosure claims the benefit of priority to, and is a continuation of, U.S. Pat. No. 18,051,383 filed on Oct. 31, 2022, and entitled "Portable Playback Device State Variable," which is a continuation of U.S. application Ser. No. 17/562,078 filed on Dec. 27, 2021, issued as U.S. Pat. No. 11,487,500, and entitled "Portable Playback Device State Variable," which is a continuation of U.S. application Ser. No. 16/658,343 filed on Oct. 21, 2019, issued as U.S. Pat. No. 11,210,053, and entitled "Portable Playback Device State Variable," which is a continuation of U.S. application Ser. No. 16/142,618 filed on Sep. 26, 2018, issued as U.S. Pat. No. 10,452,346, and entitled "Portable Playback Device State Variable," which is a continuation of U.S. application Ser. No. 15/898,386 filed on Feb. 16, 2018, issued as U.S. Pat. No. 10,120,643, and entitled "Portable Playback Device State Variable," which is a continuation of U.S. application Ser. No. 14/977,113 filed Dec. 21, 2015, issued as U.S. Pat. No. 9,898,244, and entitled "Portable Playback Device State Variable," which is a continuation of U.S. application Ser. No. 13/534,404 filed Jun. 27, 2012, issued as U.S. Pat. No. 9,715,365, and entitled "Systems and Methods for Mobile Music Zones," the contents of each of which are hereby incorporated by reference in their entirety for all purposes.

FIELD OF THE DISCLOSURE

The disclosure is related to consumer goods and, more particularly, to systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology are better understood with regard to the following description, appended claims, and accompanying drawings.

Figure 1:
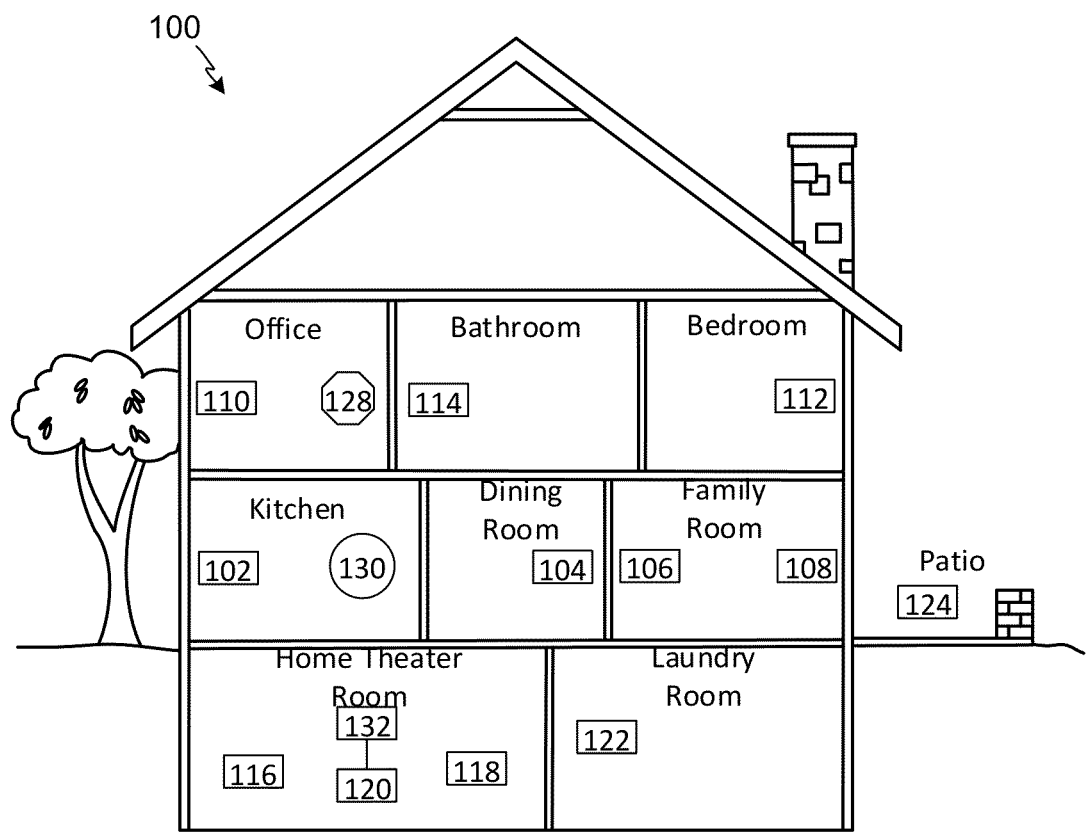
FIG. 1 shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

Wired, wireless, or both types of networks are used to connect one or more multimedia playback devices to establish a playback network in a home (e.g., a home audio system) or other location. For example, a network, such as an ad-hoc network, is established in a home to facilitate communications among a group of playback devices. Music and other types of multimedia content can be shared among the playback devices and/or groups of playback devices associated with a playback network. At least one of the playback devices may be removed from the ad-hoc network to be used to playback audio at a different location, such as, for example, at a beach, park, on a boat, or in a hotel room. Once finished, the at least one playback device may be rejoined to the ad-hoc network in a relatively seamless manner to the user.

Certain embodiments provide a method to provide portable playback of audio content regardless of network connection. The example method includes identifying, via a portable playback device, an available network for content playback. The example method includes automatically connecting the portable playback device to the available playback network. The example method includes facilitating control and playback of content on the playback network via the portable playback device. The example method includes establishing a mobile zone in an absence of an available playback network. The mobile zone is to facilitate local content playback in the mobile zone via the portable playback device. The example method includes automatically switching between an available playback network and the mobile zone to provide content playback via the portable playback device.

Certain embodiments provide an apparatus for portable playback of multimedia content, the apparatus portable by a user. The example apparatus includes a communication interface to send and receive data via a network connection, the data including multimedia content for playback. The example apparatus includes a memory to store instructions and data. The example apparatus includes a processor. The example processor is to search for an available playback network and, if available, automatically connect to the playback network. The example processor is to, in an absence of an available network, establish a mobile zone, the mobile zone to facilitate multimedia content playback via the mobile zone. The example processor is to automatically switch between the playback network and the mobile zone depending upon availability of the playback network to provide content playback via the portable playback device. The example processor is to facilitate control and playback of content on the playback network via the portable playback device.

Certain embodiments provide a tangible computer readable storage medium including instructions for execution by a processor, the instructions, when executed by the processor, implementing a portable playback system. The example system is arranged to search for an available playback network and, if available, automatically connect to the playback network. The example system is arranged to, in an absence of an available network, establish a mobile zone, the mobile zone to facilitate multimedia content playback via the mobile zone. The example system is arranged to automatically switch between the playback network and the mobile zone depending upon availability of the playback network to provide content playback via the portable playback device. The example system is arranged to facilitate control and playback of content on the playback network via the portable playback device.

Many other embodiments are described herein to provide mobile music to a user.

II. An Example Operating Environment

Referring now to the drawings, in which like numerals can refer to like parts throughout the figures, FIG. 1 shows an example system 100 in which one or more embodiments disclosed herein can be practiced or implemented.

By way of illustration, system 100 represents a home presently configured with multiple zones, though the home could have been configured with only one zone. Each zone in the home, for example, may represent a different room or space, such as an office, bathroom, bedroom, kitchen, dining room, family room, home theater room, utility or laundry room, and patio. A single zone might also include multiple rooms if so configured. One or more of zone players 102-124 are shown in each respective zone of the home. A zone player 102-124, also referred to as a playback device, multimedia unit, speaker, player, and so on, provides audio, video, and/or audiovisual output. Controller 130 provides control to system 100. Controller 130 may be fixed to a zone, or alternatively, mobile such that it can be moved about the zones. System 100 may also include more than one controller 130. System 100 illustrates an example whole house audio system, though it is understood that the technology described herein is not limited to its particular place of application or to an expansive system like a whole house audio system 100 of FIG. 1.

A. Example Zone Players

Figure 2A:
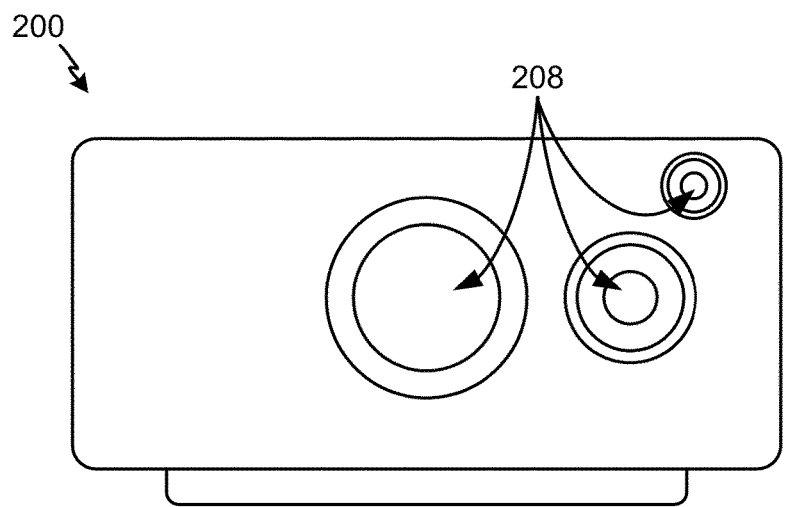
FIG. 2A shows an illustration of an example zone player having a built-in amplifier and speakers.
Figure 2B:
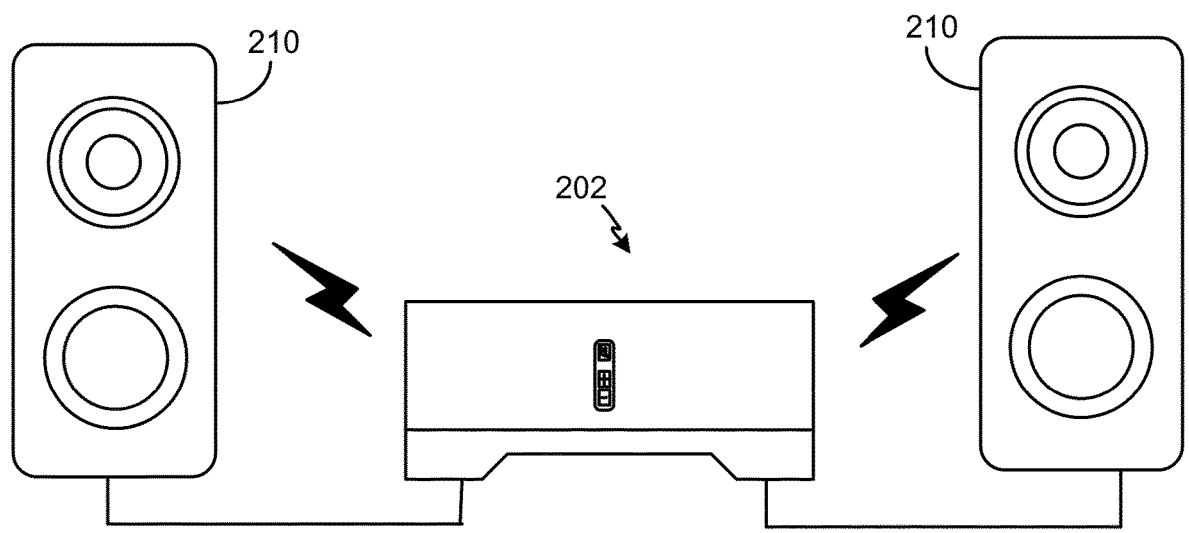
FIG. 2B shows an illustration of an example zone player having a built-in amplifier and connected to external speakers.
Figure 2C:
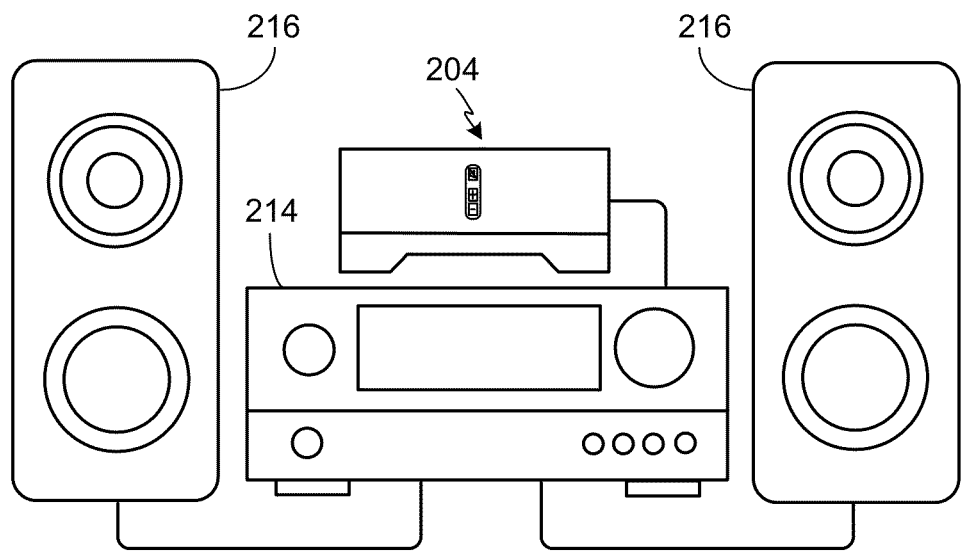
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more speakers. A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128, the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, California presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device.

B. Example Controllers

Figure 3:
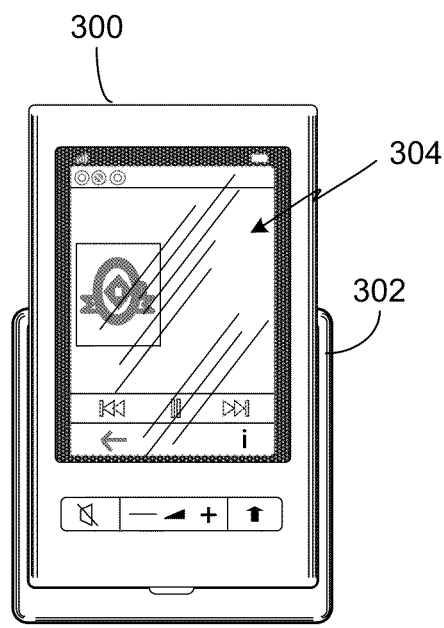
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination might happen, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by SONOS, Inc. of Santa Barbara, California include a "Controller 200," "SONOS CONTROL," "SONOS® Controller for IPHONE™," "SONOS® Controller for IPAD™," "SONOS® Controller for ANDROID™," "SONOS® Controller for MAC™ or PC."

C. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

D. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

E. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Zone Players

Figure 4:
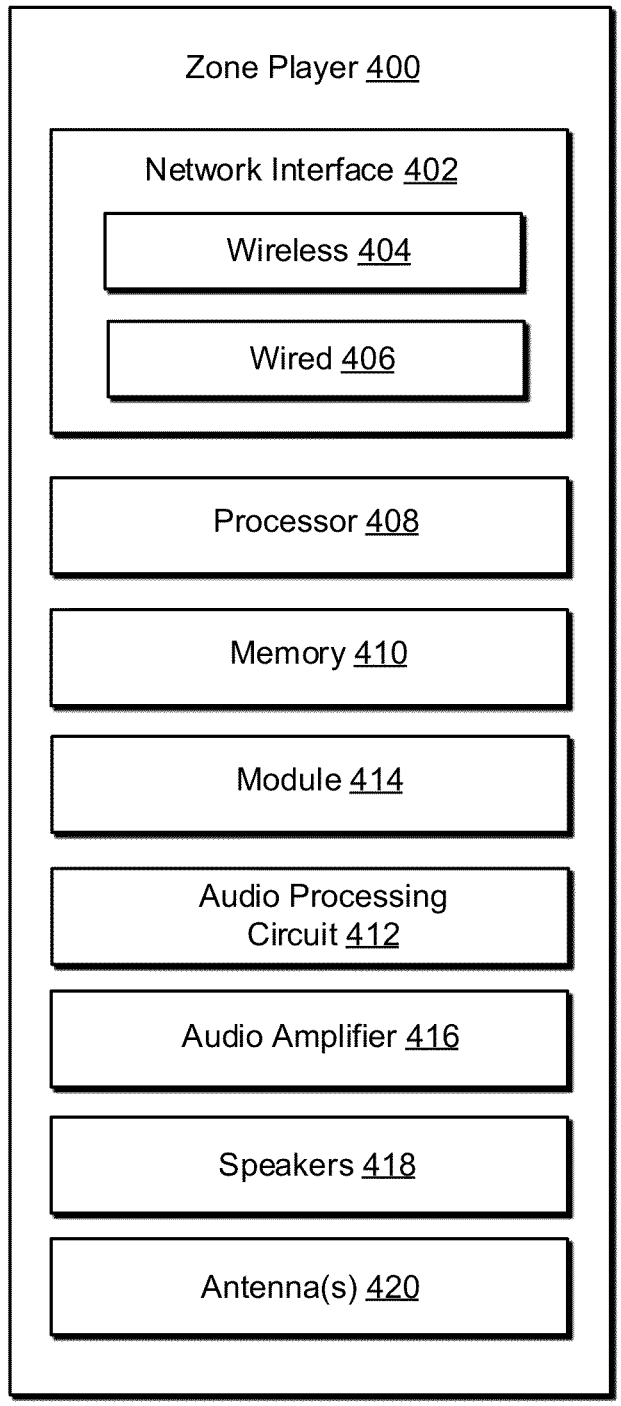
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standards including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task might be for the zone player 400 to synchronize playback of audio with one or more additional zone players. In some embodiments, a task might be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5, is a zone player with a built-in amplifier and speakers that is capable of retrieving audio directly from the source, such as on the Internet or on the local network, for example. In particular, the PLAY:5 is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, just from different channels of audio. Audio from Internet radio stations, online music and video services, downloaded music, analog audio inputs, television, DVD, and so on, can be played from the PLAY:5.

IV. Controller

Figure 5:
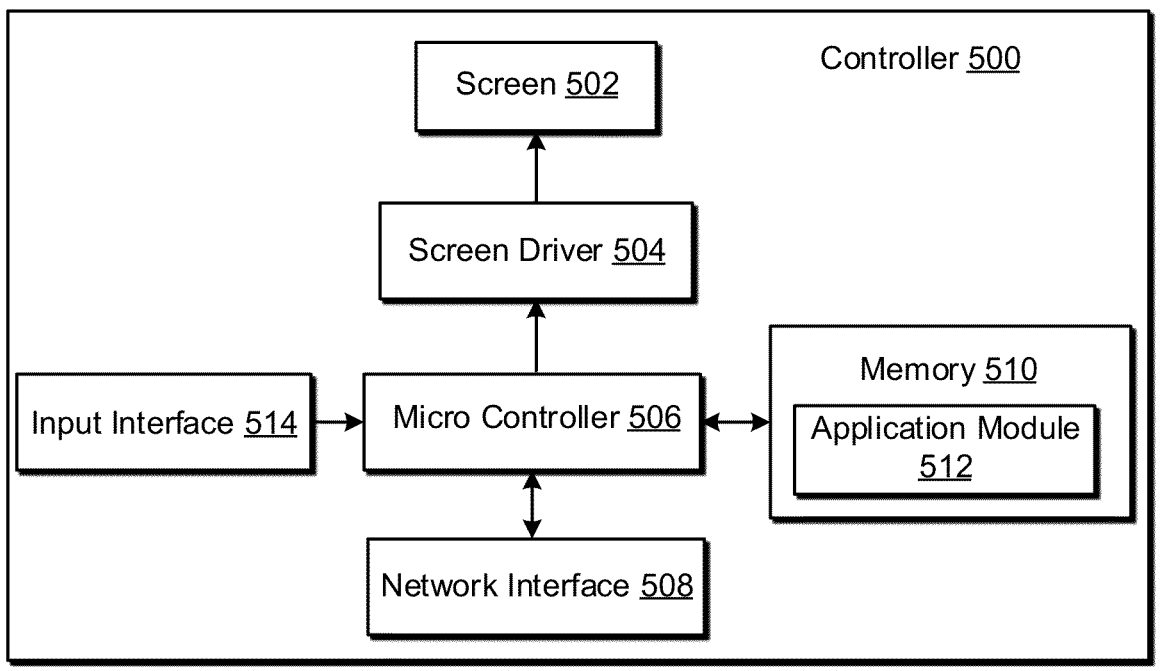
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, or 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE®, IPAD® or any other smart phone or network-enabled device (e.g., a networked computer such as a PC or Mac®) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups could be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-group a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command might include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
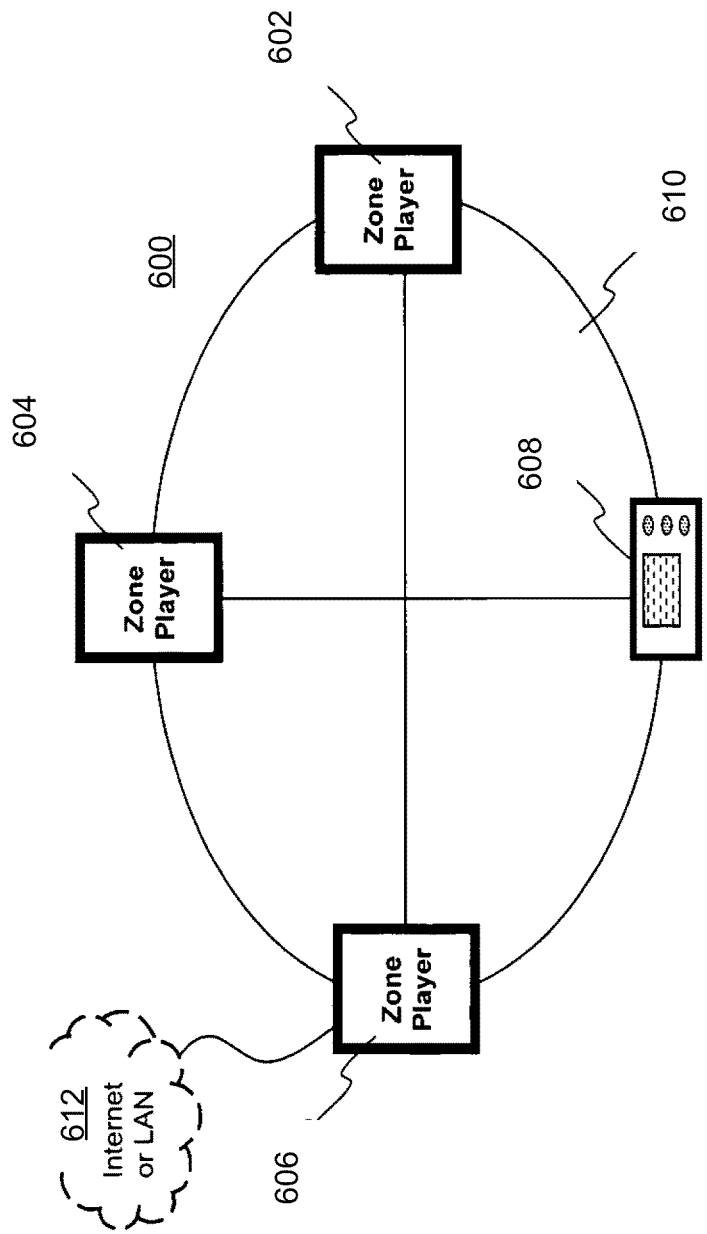
FIG. 6 shows an example ad-hoc playback network.

Certain particular examples are now provided in connection with FIG. 6 to describe, for purposes of illustration, certain systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is generally no one access point for all traffic. With an established Ad-Hoc network 610, the devices 602, 604, 606 and 608 can all communicate with each other in a "peer-to-peer" style of communication, for example. Furthermore, devices may come/and go from the network 610, and the network 610 will automatically reconfigure itself without needing the user to reconfigure the network 610. While an Ad-Hoc network is referenced in FIG. 6, it is understood that a playback network may be based on a type of network that is completely or partially different from an Ad-Hoc network.

Using the Ad-Hoc network 610, the devices 602, 604, 606, and 608 can share or exchange one or more audio sources and be dynamically grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 610 (or household identifier), though a HOUSEHOLD may be identified with a different area or place.

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), SSID (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 608 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet and/or Wireless, while the connectivity to other devices 602, 604 and 608 is based on Wireless and Ethernet if so desired.

It is understood, however, that in some embodiments each zone player 606, 604, 602 may access the Internet when retrieving media from the cloud (e.g., Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Mobile Music

Figure 7:
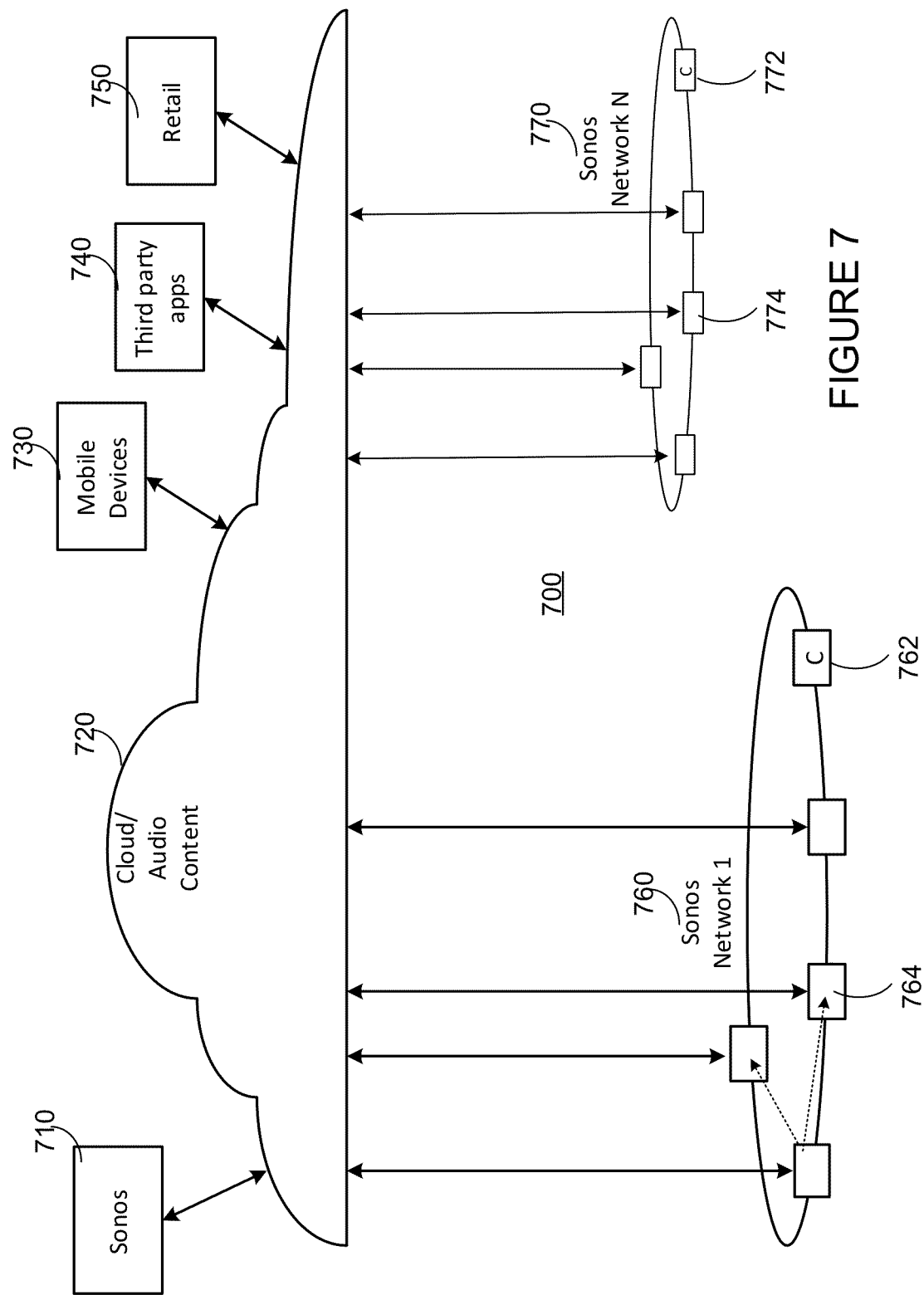
FIG. 7 shows a system including a plurality of networks including a cloud-based network and at least one local playback network.

In the example system such as the one shown in FIG. 1, 6, or 7 where a SONOS system including one or more playback devices and one or more controllers is connected together in a local area network (LAN), the ability to move the audio experience into and away from the home location in a seamless or substantially seamless fashion to the user may be valuable. For example, according to some embodiments, a portable playback device allows a user to move the audio experience from the home location to a location where the user goes, such as to the beach, park, hotel, friend's house, boat, car, or generally wherever the user decides to go. Further, the ability of a portable device to extend the audio experience from the home location to an on-the-go experience, such as going to the beach or park, walking, or jogging, in a seamless or substantially seamless fashion may be valuable.

A. Example Portable Playback Device

In an embodiment, a portable playback device includes a zone player described in FIGS. 2 and 4. In an embodiment, the portable playback device includes a broadband interface to connect directly to the Internet without first connecting to a LAN using the wireless or wired interface. In another embodiment, the portable playback device includes a Bluetooth or other wireless interface to be paired to a mobile device such as a smart phone, tablet computer, or laptop. In yet another embodiment, the portable playback device includes a battery pack so that the playback device does not need to be connected to a mains service to operate. In yet another embodiment, the portable playback device includes built-in control functionality of the controller described in FIGS. 3 and 5, such as a display screen and input interface to enable user configuration and control of the playback device or system of playback devices. In yet another embodiment, the portable playback device is designed to withstand certain weather and outdoor conditions.

Figure 8:
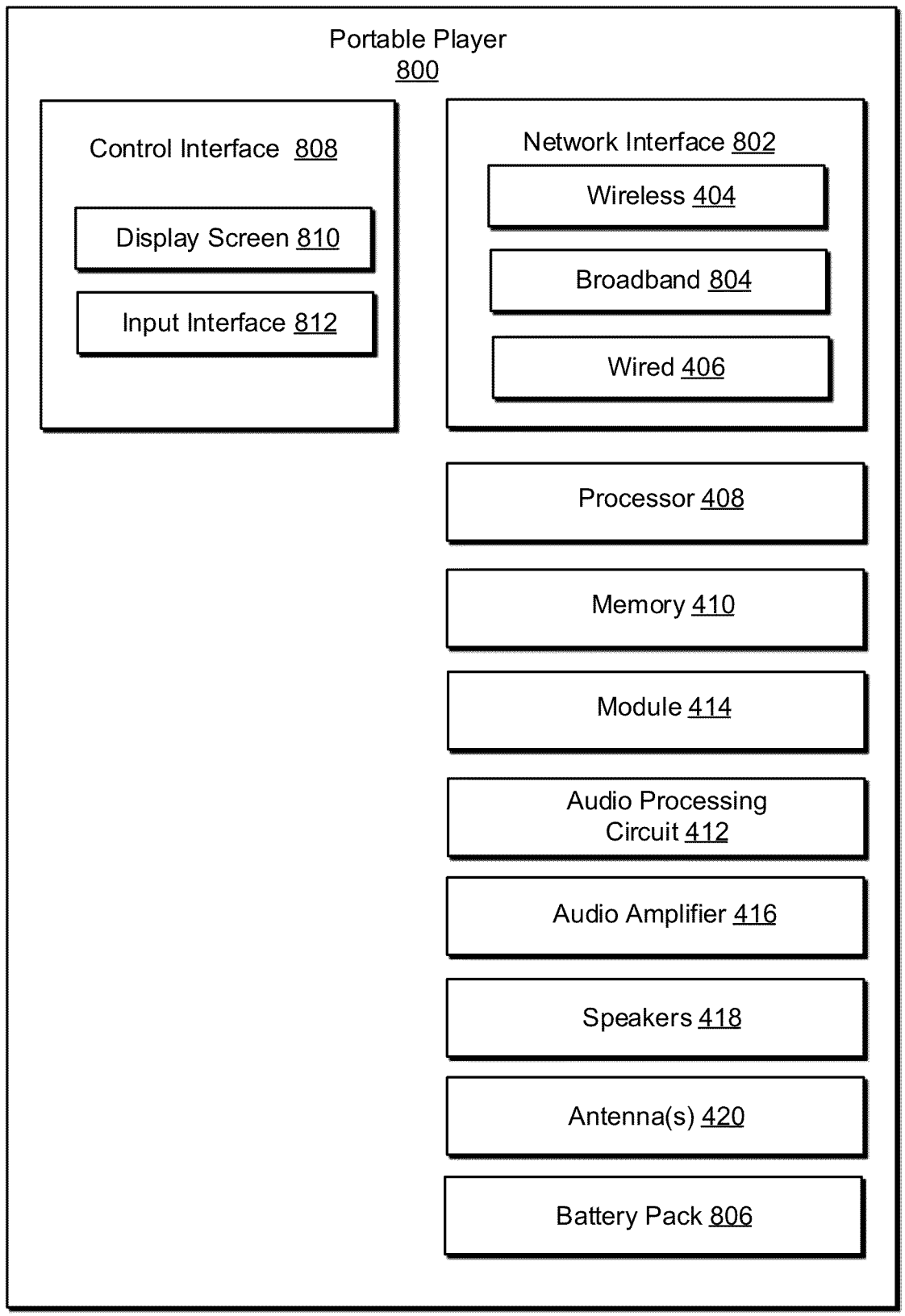
FIG. 8 shows an internal functional block diagram of an example portable player.

Like the example zone player 400 of FIG. 4, the example portable player 800 of FIG. 8 includes a processor 408, memory 410, an audio processing component 412, a module 414, an audio amplifier 416, speakers 418, and one or more antenna(s) 420. These components are discussed in more detail above. More or less components may be included depending on the desired configuration. The example portable player 800 includes a network interface 802 including a wireless interface 404, wired interface 406, and broadband interface 804. The wireless interface 404 and wired interface 406 are discussed above. The broadband interface 804 provides broadband Internet access based on industry standards such as 3G or 4G or Bluetooth, for example. The example portable player 800 includes a battery pack 806 to provide power to the device when not using mains input. The battery pack may use a single battery or a collection of batteries and the batteries may be rechargeable or non-rechargeable. The control interface 808 includes a display screen 810 and an input interface 812. The display screen 800 may be an LCD screen, for example. The input interface 812 may be a touch panel interface, a hard button interface, a capacitive or resistive touch interface with corresponding soft keys that may or may not be present (e.g., visible) at all times, and so on.

By way of illustration, a portable playback device might include a playback device capable of being carried around by a person (e.g., an existing SONOS PLAY:3 or PLAY:5 can be carried and may further be configured via software to operate as a portable playback device), a playback device designed for portability (e.g., one that is easily carried and/or battery powered), a playback device designed for outdoor use, a smart phone configured to operate such as described herein with speakers and/or an audio output, similarly, a tablet with speakers and/or an audio output, an existing zone player that is modified via hardware and/or software to operate as a portable playback device, and so on.

In some embodiments, the portable playback device provides an ambient sound solution. For example, the portable playback device may be used alone and/or in conjunction with one or more other playback devices to create a sound space. A sound space is an area that has a particular sound texture, for example. Rather than outputting sound to a large space, the portable playback device may shape or focus an output sound for listening in a portion of a room or other space. For example, an orientation, position, output parameter, and/or other setting of the portable playback device may be used to focus and/or otherwise shape sound output by the portable playback device into a surrounding space. In an embodiment, the portable playback device may be used to provide an ambient sound solution when connected to a home audio playback system, but otherwise used as a full-range or mostly full-range loudspeaker system.

In some embodiments, the portable playback device has multiple power modes. For example, in addition to normal powering mode, the portable player may operate in a low-power mode. This can be used, for example, when operating in mobile mode and/or when operating with a battery. In another example, the portable player may have on/off capability or a standby mode. For example, the portable player may have a user accessible button or other user interface to turn off and/or put the portable player into standby mode. In another example, the portable player has its own power management intelligence to shut down and/or go into standby mode.

B. Portability

In some embodiments, a portable playback device is added to a home network or HOUSEHOLD, such as described above with respect to FIGS. 1 and 6, for example. Adding a zone player such as a portable playback device to a home network may be accomplished for example via minimum human intervention in which a button press on the device, or some other user action, subsequent to initiating a "join household" procedure on a controller enables the portable playback device to join the network (e.g., join a SONOSNET™ network). In some embodiments, other methods of joining the portable playback device to the home network may be employed.

In some embodiments, when a zone player such as a portable playback device joins a home network, it is provided with a globally unique system identifier (e.g., household ID or HHID) that identifies the playback network. The system identifier may be determined when the playback network is first established and all devices (e.g., zone players and controllers) in a playback network have the same system identifier.

Once the portable playback device joins the home network, it can be assigned to a room or zone and incorporated into the audio system. For instance, the portable playback device may be assigned to the kitchen and form a kitchen zone, if a kitchen zone is not already established. In another instance, the portable playback device may be assigned to a portable zone that is moved about the house without a fixed location. In another instance, the portable playback device may be configured to play with other players in an established zone group, such as in synchrony or in stereo pair with another player In yet another instance, the portable playback device is used to provide ambient sound. In another instance, the portable playback device is used to provide more directed sound.

Similar to other zone players in the example system, the portable playback device may be dynamically reconfigured to another zone or zone group. This may be done by a user using a user interface on a controller or player, or by some other mechanism. For example, the portable playback device might be moved from the kitchen zone to the family room zone. In one embodiment, the user can use a controller to make the system change by reassigning the portable player to the family room zone. In another embodiment, the portable playback device can be added to another zone without using the controller by using a button-press combination on the portable playback device and a zone player that is already part of that zone. In yet another embodiment, proximity detection may be used to automatically join the portable playback device to a zone or zone group.

In some embodiments, the playback system makes use of a state variable that maintains information about the playback system, for example, the identification of zone players on the home network, the zone group configurations, and other aspects may be stored in the state variable. The state variable is known, configured, or learned through communication between devices in a home network. The zone players automatically update the state variable when they join and/or disengage from the various zone groups to reflect the change in membership of the respective groups. The zone players may also update the state variable when a device, such as the portable playback device, leaves or comes back within the network range. The state variable may be provided, upon request or periodically, to a controller to notify the user of the current system configuration.

In some embodiments, when a portable playback device is powered off and power is subsequently restored to the device, the portable playback device is programmed to automatically rejoin the playback network. For example, when power is restored in a portable playback device that is part of a playback network, the device uses the state variable to identify the playback network to be re-joined. Once the device has joined the playback network, it can, in some embodiments, query a zone player or a controller in the network for system information and update the state variable accordingly.

When a portable playback device leaves the playback network, the system can detect without user input that the player is missing and therefore update the state variable accordingly. For example, if the portable playback device is powered off or carried outside of the network range, then the system determines that the playback device has left and communication with the portable player has stopped over the local network. In some embodiments, the user is notified via a controller that the portable playback device is no longer connected to the home playback network.

In some embodiments, the zone players of the home playback network automatically reconfigure themselves to account for the missing portable playback device. For example, upon detecting that a portable playback device is missing and the portable playback device was in stereo pair, the remaining player will temporarily remove the stereo pairing and play the full-range audio. When the portable playback device is returned to the home network, the stereo pairing may be automatically re-engaged and the two players will play in stereo pair (e.g., right and left channel or some other multi-channel audio). Other zone player configurations may be automatically modified to deal with a missing player, such as volume changes (e.g., increase the volume of remaining players to make up for a missing portable player), EQ changes, channel routing changes, frequency changes, and so on. When the portable player is returned, then the system may resort back to its previous settings.

When the portable playback device is moved outside of the range of the playback network and can no longer connect to an existing playback network (e.g., it falls outside of the wireless range), the portable playback device remains able to operate and play back content. In one embodiment, the state variable stored in the playback device may update to reflect that it is no longer part of the home network and must establish its own mechanism to get audio. As such, the portable playback device may be able to connect to, or establish, a playback network (such as in the home) and to connect to, or establish, a mobile zone to play multimedia content via the portable playback device (such as a location away from the home). For example, the portable playback device, when out of the range of the household playback network, can access music directly via cloud-based storage, via local storage (e.g., a mobile phone, tablet computer, and so on), via a streaming source (e.g., from a mobile phone, tablet computer, and so on), or some other means described herein.

In some embodiments, more than one portable playback device may be joined to the mobile zone. For example, a user may desire greater stereo separation and therefore add a second portable playback device to the mobile zone and stereo pair the two devices wirelessly. In another example, a user may wish to play two or more devices in synchrony while connected via the mobile zone. To do so, each playback device that is joined to the mobile zone may share a state variable indicating the configuration setup mobile network ID.

In some embodiments, at least two separate system IDs are maintained by the portable playback device. For instance, a Home Network System ID (HHID 1) and a mobile network ID (HHID 2) is maintained and stored at the portable playback device. In an embodiment, if a portable playback device can see devices from both systems (e.g., it detects a network from each of HHID 1 and HHID 2), then the device will join by default, for example, to the Home network system with system ID HHID 1. However, if a portable playback device can only recognize one system, then the device will join that system. In an embodiment, a controller, used to control both networks, is preferably updated to indicate what network the portable playback device is currently joined.

C. Control

As described above, in some embodiments, when a user configures the playback network, such as to configure zone groups, establish a stereo pairing, establish a subwoofer pairing, and so on, a state variable that describes the system configuration is updated to reflect the change in configuration. The state variable may then be stored at one or more of the playback devices and retrieved by a controller when needed.

In some embodiments, when a portable playback device is part of the home network, the controller can display system and playback information of the home network to the user. When, the portable playback device is not part of the home network, the controller may likewise display the system and playback information of the home network to the user.

In some embodiments, the controller interface adapts depending on whether it is connected to the home network or whether the controller (like the portable playback device) is outside of the home network. For example, when the controller is connected to the home playback network, it may display all of the usual information associated with the home playback network like zones and zone groups. However, when the controller is away from the home playback network, but in communication with the portable playback device, it may alter its screen to show less information about the home network and more information about the portable playback device or mobile music zone (if additional portable playback devices are paired). For example, the controller might show a "mobile zone" or some other identifier. A user can interact with the mobile zone like he or she would with a zone at home.

In some embodiments, information about the home playback network is also displayed on the controller if the controller and/or portable playback device is connected to the cloud. For example, in an embodiment, the portable playback device may connect to the home playback network via the cloud and therefore become an extension to the home network. As such, the information about the home network may also be displayed on the controller interface. In certain embodiments, a user may manage the home network from afar via the cloud.

D. Content Access

In some embodiments, audio content can come from the controller (e.g., a smart phone or some other computing device), another computing device with "Play to" the portable playback device functionality, a USB drive, a local storage drive, and the cloud. The cloud generally includes the Internet and any cloud based storage or service solutions.

In some embodiments, the controller, using account credentials, can get audio from the cloud and direct the content to the portable playback device.

In some embodiments, the portable playback device maintains account credentials; either from the home network or a guest credential, to retrieve audio content from the cloud.

In some embodiments, a portable playback device uses wireless communications to communicate with a controller and/or a network. For example, the portable playback device might contain similar wireless capabilities as a zone player, in addition to cellular capability. Such a portable playback device might implement 4G mobile communication standards or later, for example, to retrieve audio content. A portable playback device might also utilize the Bluetooth standards to get audio from the controller or computing device.

E. Example Network Illustrations

Figure 9:
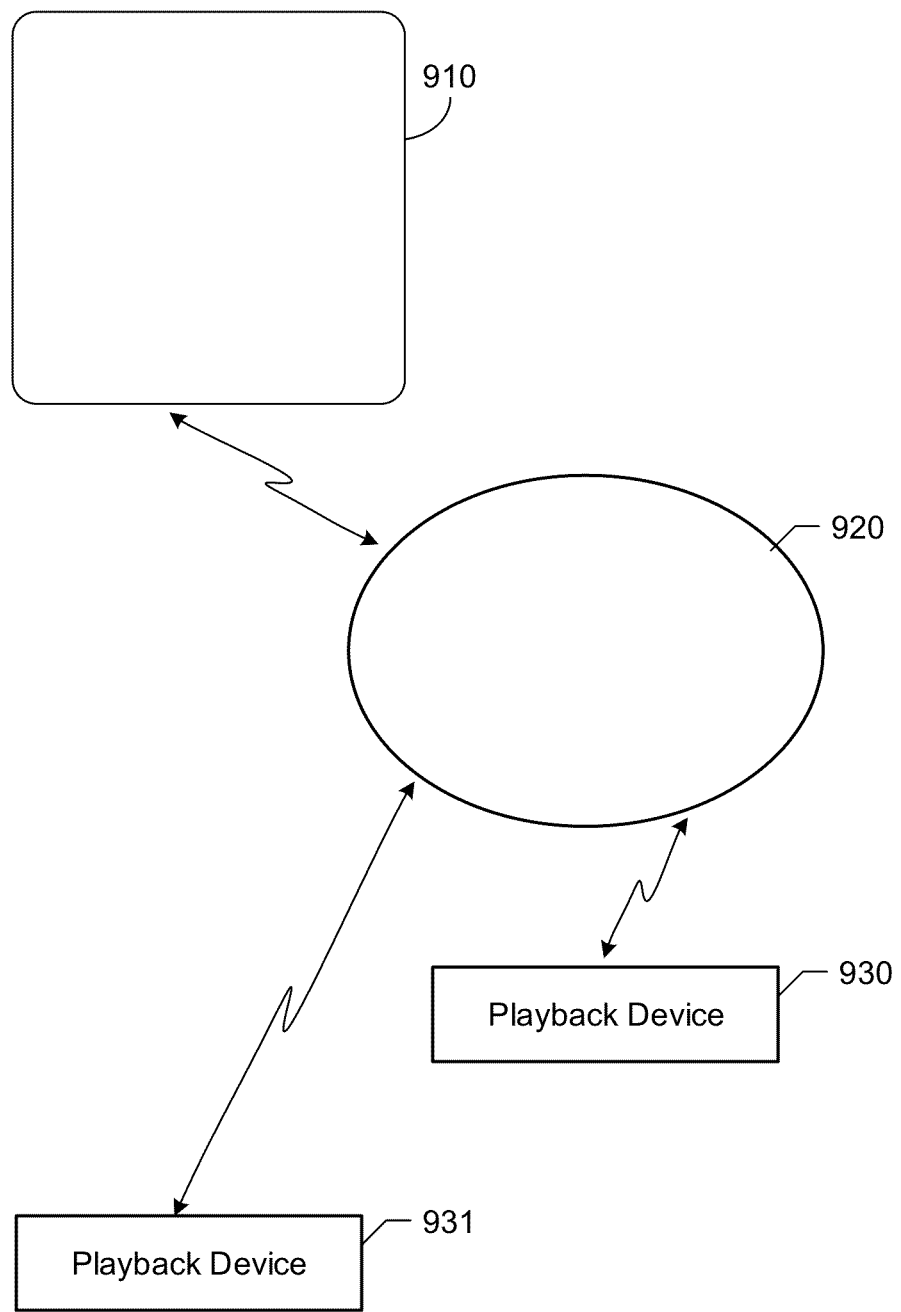
FIG. 9 illustrates an example playback network configuration including a mobile device interfacing with one or more playback devices via a network.

FIG. 9 illustrates an example playback network 900 configuration including a mobile device 910 configured to interface with one or more playback devices 930-931 via a network 920. The mobile device 910 can connect with an existing playback network 920 and/or can establish a mobile playback network to provide content to and/or retrieve content from one or more playback devices 930-931. The mobile device 910 is connected to the network 920 and allows the mobile device 910 to facilitate playback of content (e.g., audio content, such as music) via one or more of the playback devices 930-931 and/or the mobile device 910 forming part of the network. Through a connection to the network 920, the mobile device 910 may be used to control one or more playback devices 930-931, for example. Through a connection to the network 920, one or more playback devices 930-931 may be used to control the mobile device 910, for example. Through a connection to the network 920 facilitated by the mobile device 910, one or both of the mobile device 910 and one or more playback devices 930-931 may be used to browse content available for playback, for example.

F. Example Method Illustrations

Figure 10:
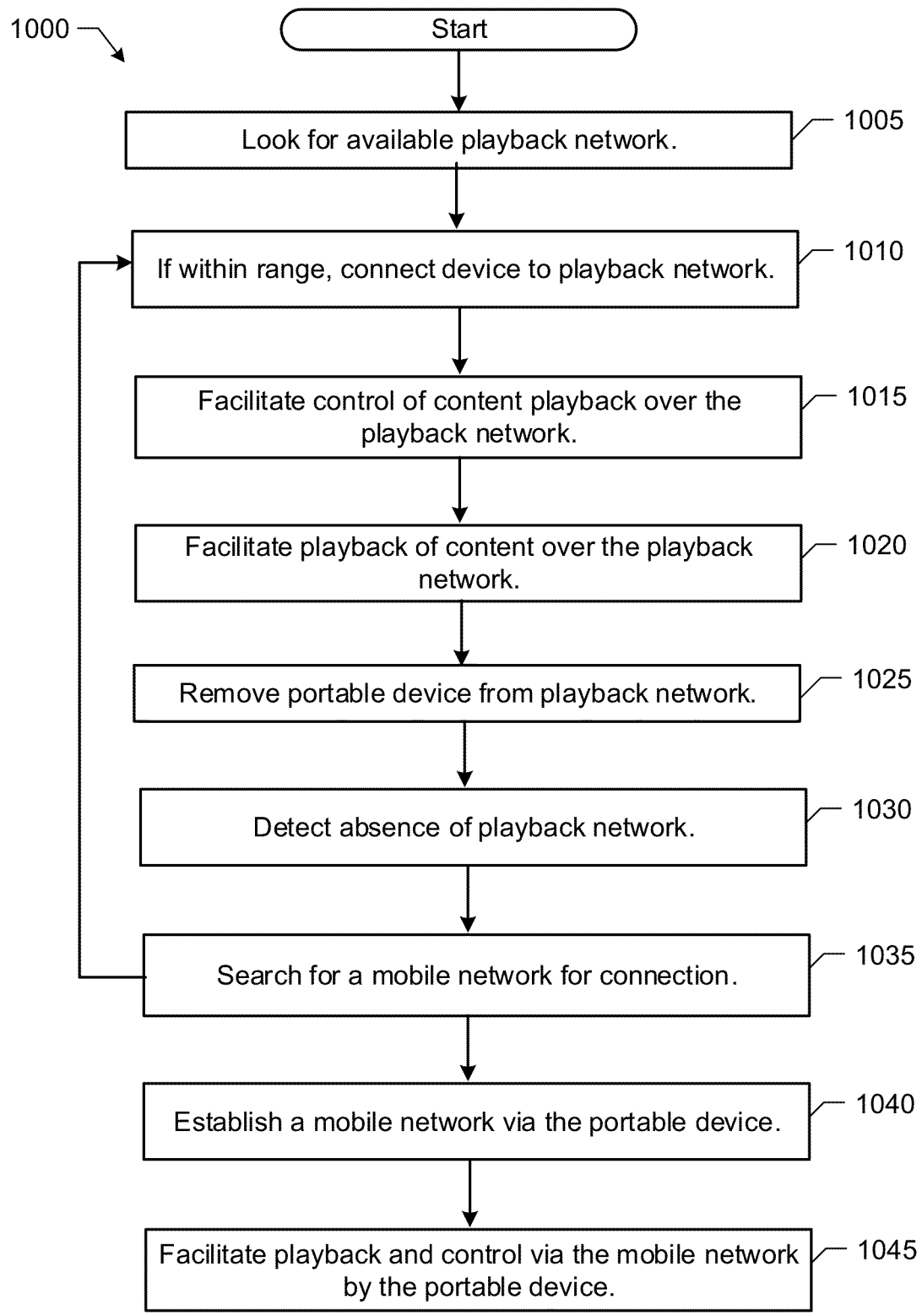
FIG. 10 illustrates a flow diagram for an example method for zone configuration and content playback via a portable playback device.

FIG. 10 illustrates a flow diagram for an example method 1000 for zone configuration and content playback via a portable playback device.

At block 1005, the portable playback device looks for an available playback network. For example, a portable zone player looks for a household or other building playback network to which it can connect. At block 1010, if the portable playback device is within a playback network (e.g., a household playback network), the portable playback device connects to the existing playback network.

At block 1015, control of content playback over the playback network is facilitated via the portable playback device. For example, the portable playback device may be synchronized with one or more playback devices also connected to the playback network. For example, the portable playback device may synchronize with one or more zone players on a household network such that the one or more zone players may playback content at the command of the portable playback device.

At block 1020, playback of content is facilitated via the playback network. For example, content available on or via the portable playback device is browsed. Content may be browsed using the portable playback device, a separate controller, one or more other playback devices connected to the playback network, and so on. Content may be selected for playback. For example, a song may be selected from a menu at or available from the docked portable playback device. Selected content is then played back through one or more playback devices connected to the network. For example, a selected song from the portable playback device is played via one or more zone players on the playback network.

At block 1025, the portable playback device is removed from the playback network. For example, the portable playback device is carried out of range of the household playback network by a user. At block 1030, absence of a playback network is detected by the portable playback device. For example, the portable playback device detects when it can no longer communicate via the playback network to which it was connected.

At block 1035, the portable playback device searches for a mobile network. For example, after being disconnected or otherwise removed from the previous playback network, the portable playback device searches for another network to which it can connect. If the portable device detects an available network, the device attempts a connection, as described above.

At block 1040, however, if no available playback network is detected, a mobile network is established by the portable playback device. For example, the portable playback device establishes a mobile zone for playback of content via the portable playback device. The portable playback device can connect to a cloud-based storage, a streaming service, access data stored locally on the portable playback device and/or other user device such as a smart phone and so on, to provide content for playback over the mobile network/zone.

At block 1045, playback and control of content are facilitated via the mobile network by the portable playback device. For example, content, playlist, volume, timing, sound shaping, and so on may be configured and facilitated for the mobile zone via the portable playback device. Another playback device can connect to the mobile zone to provide content, receive content for playback, and so on. A dynamic mobile zone group configuration may be facilitated via the mobile, ad hoc network enabled by the portable playback device, for example.

VII. Conclusion

The description discloses various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

Additionally, reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

The invention claimed is:

1. A first portable playback device comprising:
 a user interface;
 at least one processor; and
 at least one non-transitory computer-readable medium comprising program instructions that are executable by the at least one processor such that the first portable playback device is configured to:
  obtain, via a first data network utilizing a first communication protocol, first media content for playback by the first portable playback device;
  begin playing back the first media content;
  while playing back the first media content, receive a command via the user interface to play back second media content that is currently being played back by one or more other playback devices;
  based on the command, (i) stop playing back the first media content and (ii) join a synchrony group including at least a second portable playback device that is playing back the second media content;
  obtain, via a second data network utilizing a second communication protocol, the second media content for synchronous playback with at least the second portable playback device; and
  begin playing back the second media content in synchrony with playback of the second media content by the second portable playback device.

2. The first portable playback device of claim 1, wherein at least the first portable playback device comprises a headphone device.

3. The first portable playback device of claim 1, wherein the second communication protocol is different from the first communication protocol.

4. The first portable playback device of claim 3, wherein the first communication protocol is IEEE 802.15 and wherein the second communication protocol is IEEE 802.11.

5. The first portable playback device of claim 1, wherein:
 the synchrony group further includes a third playback device that is not a portable playback device; and
 the program instructions that are executable by the at least one processor such that the first portable playback device is configured to begin playing back the second media content in synchrony with the playback of the second media content by the second portable playback device comprise program instructions that are executable by the at least one processor such that the first portable playback device is configured to:
  begin playing back the second media content in synchrony with respective playback of the second media content by the second portable playback device and the third playback device,
   wherein the respective playback of the second media content by the third playback is muted while the first portable playback device is playing back the second media content in synchrony with the respective playback of the second media content by the second portable playback device.

6. The first portable playback device of claim 5, further comprising program instructions stored on the at least one non-transitory computer-readable medium that are executable by the at least one processor such that the first portable playback device is configured to:
 receive, from the third playback device, a command to leave the synchrony group; and
 based on the command, leave the synchrony group.

7. The first portable playback device of claim 1, further comprising program instructions stored on the at least one non-transitory computer-readable medium that are executable by the at least one processor such that the first portable playback device is configured to:
 determine that the first portable playback device is out of range of the second data network; and
 based on determining that that the first portable playback device is out of range of the second data network, leave the synchrony group.

8. The first portable playback device of claim 7, wherein:
 the program instructions that are executable by the at least one processor such that the first portable playback device is configured to obtain, via the first data network, the first media content comprise program instructions that are executable by the at least one processor such that the first portable playback device is configured to:
  receive, via the first data network from a control device, the first media content for playback by the first portable playback device; and
 the first portable playback device further comprises program instructions stored on the at least one non-transitory computer-readable medium that are executable by the at least one processor such that the first portable playback device is configured to:
  based on determining that that the first portable playback device is out of range of the second data network, obtain, via the first data network from the control device, third media content for playback by the first portable playback device.

9. The first portable playback device of claim 1, wherein:
 before joining the synchrony group, the first portable playback device is a member of a portable playback zone of a media playback system that includes the first portable playback device and the second portable playback device;
 the synchrony group comprises a home theater zone of the media playback system; and
 the program instructions that are executable by the at least one processor such that the first portable playback device is configured to join the synchrony group comprise program instructions that are executable by the at least one processor such that the first portable playback device is configured to join the home theater zone.

10. The first portable playback device of claim 1, further comprising program instructions stored on the at least one non-transitory computer-readable medium that are executable by the at least one processor such that the first portable playback device is configured to:
after receiving the command to play back the second media content that is currently being played back by one or more other playback devices, determine a respective proximity of one or more playback devices of the synchrony group to the first portable playback device,
wherein the program instructions that are executable by the at least one processor such that the first portable playback device is configured to join the synchrony group including at least the second portable playback device comprise program instructions that are executable by the at least one processor such that the first portable playback device is configured to join the synchrony group based on determining the respective proximity.

11. A non-transitory computer-readable medium, wherein the non-transitory computer-readable medium is provisioned with program instructions that, when executed by at least one processor, cause a first portable playback device to:
obtain, via a first data network utilizing a first communication protocol, first media content for playback by the first portable playback device;
begin playing back the first media content;
while playing back the first media content, receive a command via a user interface of the first portable playback device to play back second media content that is currently being played back by one or more other playback devices;
based on the command, (i) stop playing back the first media content and (ii) join a synchrony group including at least a second portable playback device that is playing back the second media content;
obtain, via a second data network utilizing a second communication protocol, the second media content for synchronous playback with at least the second portable playback device; and
begin playing back the second media content in synchrony with playback of the second media content by the second portable playback device.

12. The non-transitory computer-readable medium of claim 11, wherein at least the first portable playback device comprises a headphone device.

13. The non-transitory computer-readable medium of claim 11, wherein the second communication protocol is different from the first communication protocol.

14. The non-transitory computer-readable medium of claim 11, wherein:
the synchrony group further includes a third playback device that is not a portable playback device; and
the program instructions that, when executed by at least one processor, cause the first portable playback device to begin playing back the second media content in synchrony with the playback of the second media content by the second portable playback device comprise program instructions that, when executed by at least one processor, cause the first portable playback device to:
begin playing back the second media content in synchrony with respective playback of the second media content by the second portable playback device and the third playback device,
wherein the respective playback of the second media content by the third playback is muted while the first portable playback device is playing back the second media content in synchrony with the respective playback of the second media content by the second portable playback device.

15. The non-transitory computer-readable medium of claim 14, wherein the non-transitory computer-readable medium is also provisioned with program instructions that, when executed by at least one processor, cause the first portable playback device to:
receive, from the third playback device, a command to leave the synchrony group; and
based on the command, leave the synchrony group.

16. The non-transitory computer-readable medium of claim 11, wherein the non-transitory computer-readable medium is also provisioned with program instructions that, when executed by at least one processor, cause the first portable playback device to:
determine that the first portable playback device is out of range of the second data network; and
based on determining that that the first portable playback device is out of range of the second data network, leave the synchrony group.

17. The non-transitory computer-readable medium of claim 16, wherein:
the program instructions that, when executed by at least one processor, cause the first portable playback device to obtain, via the first data network, the first media content comprise program instructions that, when executed by at least one processor, cause the first portable playback device to:
receive, via the first data network from a control device, the first media content for playback by the first portable playback device; and
the non-transitory computer-readable medium is also provisioned with program instructions that, when executed by at least one processor, cause the first portable playback device to:
based on determining that that the first portable playback device is out of range of the second data network, obtain, via the first data network from the control device, third media content for playback by the first portable playback device.

18. The non-transitory computer-readable medium of claim 11, wherein:
before joining the synchrony group, the first portable playback device is a member of a portable playback zone of a media playback system that includes the first portable playback device and the second portable playback device;
the synchrony group comprises a home theater zone of the media play back system; and
the program instructions that, when executed by at least one processor, cause the first portable playback device to join the synchrony group comprise program instructions that, when executed by at least one processor, cause the first portable playback device to join the home theater zone.

19. The non-transitory computer-readable medium of claim 11, wherein the non-transitory computer-readable medium is also provisioned with program instructions that, when executed by at least one processor, cause the first portable playback device to:

after receiving the command to play back the second media content that is currently being played back by one or more other playback devices, determine a respective proximity of one or more playback devices of the synchrony group to the first portable playback device,
wherein the program instructions that, when executed by at least one processor, cause the first portable playback device to join the synchrony group including at least the second portable playback device comprise program instructions that when executed by at least one processor cause the first portable playback device to join the synchrony group based on determining the respective proximity.

20. A method carried out by a first portable playback device, the method comprising:
obtaining, via a first data network utilizing a first communication protocol, first media content for playback by the first portable playback device;
beginning playback of the first media content;
while playing back the first media content, receiving a command via a user interface of the first portable playback device to play back second media content that is currently being played back by one or more other playback devices;
based on the command, (i) stopping playback of the first media content and (ii) joining a synchrony group including at least a second portable playback device that is playing back the second media content;
obtaining, via a second data network utilizing second communication protocol, the second media content for synchronous playback with at least the second portable playback device; and
beginning playback of the second media content in synchrony with playback of the second media content by the second portable playback device.

* * * * *